United States Patent Office 3,197,463
Patented July 27, 1965

3,197,463
CERTAIN AZIRIDINE COMPOUNDS
Giuliana C. Tesoro, Dobbs Ferry, N.Y., and Stephen B. Sello, Bergenfield, N.J., assignors to J. P. Stevens & Co., Inc., New York, N.Y., a corporation of Delaware
No Drawing. Filed Mar. 10, 1961, Ser. No. 94,720
6 Claims. (Cl. 260—239)

The present invention relates to new, valuable aziridine compounds and methods of preparing them.

Although the reaction of organic halides, in which the reactivity of the halogen atom is not enhanced by the presence of other functional groups, with substituted and unsubstituted ethylene imines has been attempted by other investigators, to the best of our knowledge it has not been possible heretofore to obtain monomeric well defined reaction products from these reactions. Accordingly it would be highly desirable to provide not only new aziridine compounds but a novel method for the preparation thereof.

It is, therefore, an object of this invention to provide novel aziridine compounds.

A further object of this invention is to provide a novel process for the synthesis of the aforementioned aziridine compounds.

A more specific object of this invention is to provide a process for the preparation of novel aziridine compounds by reacting substituted and unsubstituted ethylene imines with selected organic halides under appropriate temperature conditions in the presence of an acid acceptor.

These and other objects will become apparent from the description hereinafter.

The novel aziridine compounds of this invention correspond to the structure (I)

$$Q {-} \left[ \begin{matrix} & & R_1 \\ & C & \\ R_4 & & \\ | & & \\ CHN & & R_2 \\ & & \\ & C{-}H \\ & & \\ & & R_3 \end{matrix} \right]_n$$

in which $n$ is an integer number having a value of 2 to 3, $R_1$, $R_2$, $R_3$ and $R_4$ are selected from the group consisting of hydrogen and a lower alkyl, and Q can be an aliphatic, aromatic or alkyl aromatic radical the valence of which is equal to $n$, and which does not contain reactive functional groupings. It will also be noted that the nitrogen of the aziridine rings are amino-nitrogens.

The novel process of this invention contemplates the reaction of organic halides, in which the halogen atom is not activated by the presence of other functional groups, with substituted and unsubstituted ethylene imines under suitable temperature conditions in accordance with the following generic Equation 1

(1)

$$n \left[ \begin{matrix} & & R_1 \\ & C & \\ HN & & R_2 \\ & C{-}H \\ & & R_3 \end{matrix} \right] + Q {-} \left[ \begin{matrix} CHX \\ | \\ R_4 \end{matrix} \right]_n \xrightarrow{\text{acid acceptor}}$$

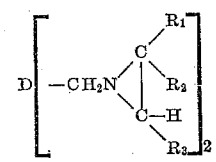
$+ n(HX)$ in which $R_1$, $R_2$, $R_3$, $R_4$, $n$ and Q have the same meaning as defined in Formula I above, but $n$ has a value from 1 to 3 and X is halogen.

Included among the new products represented by Formula I above are polyfunctional compounds characterized by the presence of the groupings

in the positions adjacent to the aziridine rings, which imparts the amine character to the nitrogen atoms, and by the absence of reactive functional groups in the radical Q, which imparts chemical stability to the compounds. These structural features are extremely important since they greatly enhance the usefulness of the new polyfunctional reagents in many industrial applications. The uses of the new compounds are to be the subject of separate applications. They include the treatment of polymers and textile fibers to impart desirable functional properties such as dimensional stability, water repellency, antistatic properties and many others.

Included among the compounds of Formula I are also new, water soluble bifunctional compounds corresponding to Formula II (II) 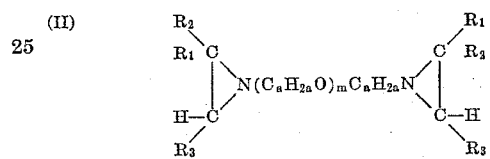

in which $R_1$, $R_2$ and $R_3$ are selected from the group consisting of hydrogen and lower alkyl, $m$ is an integer number and has a value of 1 to 50, and $a$ has a value of 2 to 4.

Compounds coming within the scope of Formula II include those corresponding to Formula III.

(III) 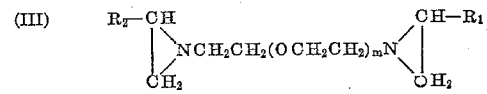

where $m$, $R_2$ and $R_1$ have the same meaning as in Formula II.

In addition other compounds coming within the scope of Formula I include those corresponding to Formula IV.

(IV)

$$D \left[ {-} CH_2N \begin{matrix} & & R_1 \\ & C & \\ & & R_2 \\ & C{-}H \\ & & R_3 \end{matrix} \right]_2$$

where $R_1$, $R_2$ and $R_3$ have the same meaning as in Formula I and D represents a bivalent aromatic or alkyl-aromatic radical.

It is evident from the reaction shown in Equation 1 that a halogen acid is formed as a by-product, and it is essential to carry out the reaction in the presence of an acid acceptor which neutralizes the acidic by-product as rapidly as it is formed. The acid acceptor is preferably an inorganic base, sparingly soluble in the reaction medium, and is selected from the group consisting of alkali metal carbonates, bicarbonates and phosphates. The presence of a suitable acid acceptor is an important condition which must be fulfilled for the satisfactory synthesis of the new compounds from organic halides.

It is apparent from the discussion above that the new process which has been discovered for the preparation of the new polyaziridines can also be employed for the preparation of monoaziridines corresponding to a generic Formula V.

(V) 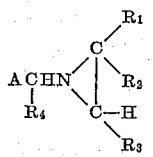

wherein $R_1$, $R_2$, $R_3$ and $R_4$ have the meaning defined above and A is an alkyl, aryl or aralkyl radical containing no reactive grouping.

The preparation of the monoaziridines of Formula V by the new process can be represented by a generic Equation 2.

(2) 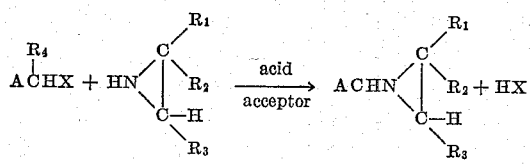

in which $R_1$, $R_2$, $R_3$, $R_4$ A and X have the meaning defined above.

Although some monoaziridines within the scope of Formula V have been previously prepared by other methods, few such compounds are known due to the difficulty of preparing them by previously known methods.

The new process of our invention allows the preparation from the readily available and inexpensive monohalides, and the grouping A in Formula V can now be varied almost at will by choosing a suitable halide for the preparation of the monoaziridine compound.

In the new preparative processes of our invention, the organic halide (chloride, bromide or iodide can be used, but the chloride is usually preferable due to its lower cost) is contacted with the imine and acid acceptor. The amount of imine used should be at least equivalent to the amount of halogen present in the organic halide, and preferably in excess. The amount of acid acceptor should be at least equivalent to the amount of halogen present, and preferably in excess. The reagents are mixed in the presence of an organic solvent. Suitable solvents are alcohols and ethers. Excess imine can also be used as solvent if desired. The temperature of reaction, and the time required in order for the reaction to approach completion depend greatly on the reactivity of the halide employed. Temperature ranging from ambient temperature to 100° C. are preferred. The extent of reaction can be established by argentometric titration of the halide ion formed in the reaction mixture, and the reaction is generally continued until the halide ion content of the mixture approaches the value calculated for 100% reaction. The inorganic salts are then removed by filtration, and the product is isolated from the filtrate by known laboratory techniques such as distillation, crystallization and the like.

Representative of the imines which can be employed in Equations 1 and 2 are the following:

ethylene imine,
2-methyl ethylene imine (also called propylene imine),
2,2 dimethyl ethylene imine,
2,3 dimethyl ethylene imine,
2-ethyl ethylene imine, and the like.

Representative of the organic halides which can be used in Equations 1 and 2 are (X=halogen):

alkyl halides $C_nH_{(2n+1)}X$, where $n=2$ to $22$,
benzyl halides $C_6H_5CH_2X$,
substituted benzyl halides,
alkylene dihalides $XC_nH_{2n}X$,
polyalkoxyglycol dihalides $X(C_aH_{2a}O)_mC_aH_{2a}X$, where $m=1$ to $50$ and $a=2$ to $4$,
substituted and unsubstituted halomethyl aromatic hydrocarbons such as xylylene dihalides $C_6H_4(CH_2X)_2$, bis halomethyl alkylated benzenes, halomethyl naphthalenes, halomethyl alkylated naphthalenes, and the like.

The new aziridines are generally solids or high boiling liquids. They can be analyzed for equivalent weight by simple electrometric titration with standard acid. The aziridine content can be determined by analytical procedures involving the opening of the aziridine ring (for example, the method described in the J. Amer. Chem. Soc. 77, p. 5918 (1955)).

The present invention will be more completely understood by reference to the following examples. In each instance all parts and percentages are by weight unless otherwise specified.

EXAMPLE 1

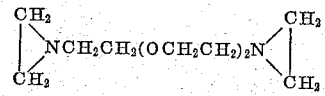

*Preparation of bisaziridine from triglycoldichloride and ethylene imine*

137.6 g. (3.2 M) of ethylene imine were dissolved in 250 g. of isopropanol and 220.8 g. (1.6 M) of anhydrous $K_2CO_3$ were added. The slurry so obtained was heated to reflux with mechanical stirring. After reaching the reflux temperature, 149.6 g. (0.8 M) of triglycoldichloride were added dropwise over a period of several hours. The course of the reaction was followed by titrating the chloride ion liberated with standard silver nitrate. After 24 hours' reaction time at the reflux temperature, 100% conversion was reached. The inorganic salts were then removed by filtration, and the solvent and excess ethylene imine were removed by distillation under reduced pressure. The residue so obtained had an equivalent weight (determined by electrometric titration) of 137 (calcd. 100). The crude product so obtained did not contain organic chloride, but was contaminated by small amounts of inorganic chloride and monofunctional compound. The presence of impurities was apparent also when the aziridine content was determined (J. Amer. Chem. Soc. 77, 5918 (1955)) and found to be somewhat lower than the calculated value of 2.0. The yield of crude product was 86% of the theoretical. The product was a water soluble viscous liquid.

EXAMPLE 2

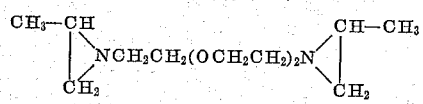

*Preparation of bisaziridine from triglycoldichloride and 2-methyl-ethylene imine*

91.2 g. (1.6 M) of 2-methyl-ethylene imine were dissolved in 160 ml. of isopropanol and 110.4 g. (0.8 M) of anhydrous $K_2CO_3$ were added. The slurry obtained was heated to reflux with mechanical stirring. After reaching the reflux temperature, 74.8 g. (0.4 M) of triglycoldichloride were added dropwise with stirring to the slurry. After 16 hours' reaction time 79%, and after 72 hours' reaction time 87% conversion was achieved. The inorganic salts were removed by filtration; the excess 2-methyl-ethylene imine and the solvent were removed by distillation under reduced pressure. The residue was a yellow viscous liquid which had an equivalent weight (determined by electrometric titration with standard HC1) of 138 (calcd. 113). The yield of crude product was 87% of the theoretical. The product was a water soluble viscous liquid.

EXAMPLE 3

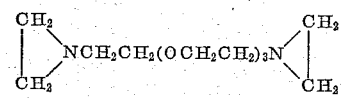

*Preparation of bisaziridine from tetraethylene glycol dichloride and ethylene imine*

68.8 g. (1.6 M) of ethylene imine were dissolved and 138.2 g. (1.0 M) of anhydrous $K_2CO_3$ were slurried in 160 g. of isopropanol. After having reached the reflux temperature, 92.2 g. (0.4 M) of tetraethylene glycol dichloride were added, dropwise to the slurry. After 12 hours' reaction time at the reflux temperature, 87% conversion was achieved. The inorganic salts were removed by filtration, the excess of ethylene imine and the solvent were removed by distillation under reduced pressure.

The crude product obtained was a yellow viscous liquid which had an aziridine content of 1.75 (calcd. 2.0) and an equivalent weight of 156 (calcd. 122). The yield was 87% of the theoretical. The product was a viscous liquid, miscible with water in all proportions.

EXAMPLE 4

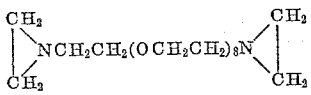

*Preparation of bisaziridine from polyethylene glycol 400 dichloride and ethylene imine*

To a mixture of 131.1 g. (0.3 M) of the dichloride obtained from the glycol known as polyethylene glycol 400, and corresponding to the formula

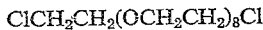

and 165.6 g. (1.2 M) of anhydrous $K_2CO_3$ in 300 g. of isopropanol there were added slowly 103 g. (2.4 M) of ethylene imine. After 22 hours reaction time at the reflux temperature of the solvent, 88% conversion was achieved. The inorganic salts were removed by filtration and the mixture was distilled under reduced pressure to remove the excess ethylene imine and the solvent. The residue consisting of crude product had an equivalent weight (determined by electrometric titration with HCl) of 268 (calcd. 225). The yield was 84%. The product was a viscous liquid at room temperature, completely soluble in water.

EXAMPLE 5

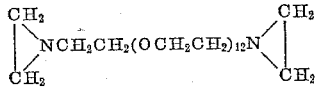

*Preparation of bisaziridine from polyethylene glycol 600 dichloride and ethylene imine*

To a mixture of 127.4 g. (0.2 M) of the dichloride prepared from the glycol known as polyethylene glycol 600 and corresponding to the formula

and 110.4 g. (0.8 M) of anhydrous $K_2CO_3$ in 400 ml. isopropanol, 68.8 g. (1.6 M) of ethylene imine were added slowly. After 32 hours' reaction time at the reflux temperature, 98% conversion was achieved. Then the inorganic salts were removed by filtration. The solvent and the excess of ethylene imine were removed by distillation under reduced pressure. The residue, consisting of crude product had an equivalent weight (by electrometric titration with HCl) of 383 (calcd. 325), and an aziridine content of 1.82 (calcd. 2.0). The yield was 87% of the theoretical. The product was a waxy, low melting solid, completely soluble in water.

EXAMPLE 6

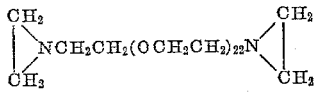

*Preparation of bisaziridine from polyethylene glycol 1000 dichloride and ethylene imine*

To a mixture of 207.4 g. (0.2 M) of the dichloride prepared from the glycol known as polyethylene glycol 1000 and corresponding to the formula

and 110.4 g. (0.8 M) of anhydrous $K_2CO_3$ in 400.0 ml. of isopropanol, 86 g. (2.0 M) of ethylene imine were added slowly. After 24 hours' reaction time at the reflux temperature, 86% conversion was achieved. Then the inorganic salts were filtered off and the solvent and excess ethylene imine were distilled off under reduced pressure. The equivalent weight of the crude product remaining was determined by electrometric titration with HCl and found to be 530 (calcd. 525). The yield was 86% of the theoretical. The product was a waxy solid at room temperature, and completely soluble in water.

EXAMPLE 7

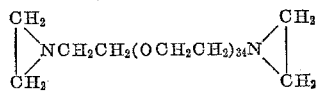

*Preparation of bisaziridine from polyethylene glycol 1540 dichloride and ethylene imine*

To a mixture of 315.4 g. (0.2 M) of the dichloride prepared from the glycol known as polyethylene glycol 1540 and corresponding to the formula

in 350.0 g. isopropanol and 110.4 g. (0.8 M) of anhydrous $K_2CO_3$, 86.0 g. (2.0 M) of ethylene imine were added slowly. After 40 hours' reaction time at the reflux temperature, 95% conversion was achieved. Then the inorganic salts were removed by filtration and the solvent and the excess of ethylene imine were distilled off under reduced pressure. The product was a waxy crystalline solid of equivalent weight (determined by electrometric titration with HCl) of 780 (calcd. 796). The yield was 84% of the theoretical, and the aziridine content was 1.9 (calcd. 2.0). The product was completely soluble in water.

The polyethylene glycols used to prepare the dihalides of Examples 3 to 7 above are for example those marketed by the Union Carbide Chemicals Co., under the name of "Carbowax polyethylene glycols," but any equivalent polyethylene glycols can be employed.

EXAMPLE 8

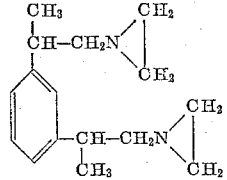

*Preparation of bisaziridine from m-diisopropenyl benzene and ethylene imine*

9.0 g. of metallic sodium in thin slices were added to 316.0 g. (2.0 M) of m-diisopropenyl benzene. Then 172.0 g. (4.0 M) of ethylene imine were added dropwise. The temperature of the reaction mixture was maintained below 50° C. After 5 hours' reaction time at room temperature, the sodium was removed by filtration. The unreacted ethylene imine was removed by distillation under reduced pressure and the residue was distilled. After removing the forerun, the desired bisaziridine was distilled at 113–115° C. at 1.5 mm. The equivalent weight of the distilled product determined by electrometric titration with HCl, was 122 (calcd. 130). The yield was 65% of the theoretical. The aziridine content was 1.9 (calcd. 2.0).

The same product could be obtained when m-bischloropropyl benzene of the formula

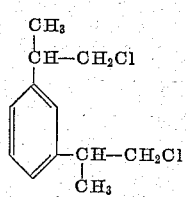

is reacted with ethylene imine in the presence of anhydrous potassium carbonate by the procedure described by aliphatic compounds in Examples 1 to 7.

The product was a colorless mobile liquid which was not readily soluble in water, but could be dispersed in aqueous systems with the aid of nonionic emulsifying agents.

EXAMPLE 9

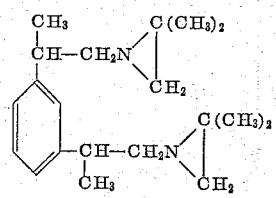

*Preparation of bisaziridine from m-diisopropenyl benzene and dimethylethylene imine*

6.0 g. of metallic sodium in thin slices were added to 63.2 g. (0.4 M) of m-diisopropenyl benzene, and 112 g. (1.6 M) of dimethyl-ethylene imine were then added dropwise. The temperature was maintained below 50° C. during the addition. The reaction mixture was heated to 100° C. for 15 minutes then cooled to room temperature. After 5 hours' reaction time at room temperature, the sodium was removed by filtration. The unreacted dimethyl-ethylene imine was distilled under reduced pressure. The crude product remaining in the residue had an equivalent weight (determined by electrometric titration with HCl of 147 (calcd. 149). The yield was 92% of the theoretical. The product was a brownish liquid.

EXAMPLE 10

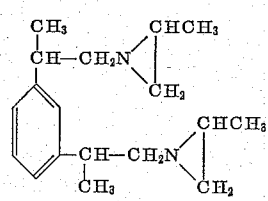

*Preparation of bisaziridine from m-diisopropenyl benzene and 2-methylethylene imine*

6.0 g. of metallic sodium in thin slices were added to 79.0 g. (0.5 M) of m-diisopropenyl benzene. Then 85.5 g. (1.5 M) of 2-methylethylene imine were added dropwise, and the temperature was maintained below 50° C. during the addition of the alkylene imine. After 5 hours' reaction time at room temperature, the sodium was removed by filtration. The unreacted 2-methylethylene imine was removed by distillation under reduced pressure. The equivalent weight of the residual crude product (determined by electrometric titration with HCl was 136 (calcd. 136). The yield was 87% of the theoretical. The product was a brownish liquid.

EXAMPLE 11

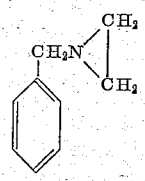

*Monoaziridine prepared from benzylchloride and ethylene imine*

138.0 g. (3.2 M) of ethylene imine were dissolved in 300 grams of isopropanol, and 207.3 g. (1.5 M) of anhydrous $K_2CO_3$ were slurried into the mixture which was heated with mechanical stirring. After the mixture reached the reflux temperature, 126.6 g. (1 M) of benzylchoride were added dropwise to this slurry with agitation, and heating was continued. After 8 hours' reaction time, 100% conversion was achieved. The inorganic salts were removed by filtration, and the solvent and excess of ethylene imine were distilled off under reduced pressure. The residual product had an equivalent weight (determined by electrometric titration with HCl) of 139.5 (calcd. 133.1) and an aziridine content of 0.95 (calcd. 1.0). The product was a clear colorless liquid, which could be purified by distillation. It was insoluble in water.

EXAMPLE 12

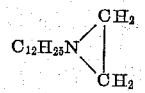

*Preparation of monoaziridine from dodecylchloride and ethylene imine*

86.0 g. (2.0 M) of ethylene imine were dissolved in 300 grams of isopropanol, and 138.2 g. (1.0 M) of anhydrous $K_2CO_3$ were added. After having reached the reflux temperature 102.4 g. (0.65 M) dodecylchloride were added slowly to the slurry. After 40 hours' reaction time at the reflux temperature, 100% conversion was achieved. The inorganic salts were removed by filtration and the solvent and the excess of ethylene imine were distilled off under reduced pressure. The product was then distilled at 122–135° C. at 6 mm. The equivalent weight of the distillate, determined by electrometric titration with HCl, was 285 (calcd. 206.5). The product could be further purified by careful fractional distillation. It was a colorless liquid and insoluble in water.

EXAMPLE 13

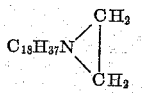

*Preparation of monoaziridine from octadecylbromide and ethylene imine*

43.0 g. (1.0 M) of ethylene imine were dissolved in 200 grams of isopropanol, and 69.2 g. (0.5 M) of anhydrous $K_2CO_3$ were added. The mixture was then heated with mechanical stirring, and after having reached the reflux temperature, 84.4 g. (0.25 M) of octadecylbromide were added to the slurry. After 14 hours' reaction time at the reflux temperature, 100% conversion was achieved. Then the inorganic salts were filtered off and the solvent and the excess of ethylene imine were removed by distillation under reduced pressure. The crude product remaining had an equivalent weight (determined by electrometric titration with HCl) of 289 (calcd. 295). The yield was 86.5% of the theoretical. The product was a water insoluble waxy solid.

EXAMPLE 14

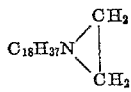

*Preparation of monoaziridine from octadecylchloride and ethylene imine*

258.0 g. (6.0 M) of ethylene imine were dissolved in 800 grams of isopropanol, and 276.4 g. (2.0 M) anhydrous $K_2CO_3$ were added. After having heated the mixture to the reflux temperature, 288.9 g. (1.0 M) of octadecylchloride were added to the slurry with stirring. After 28 hours' reaction time at the reflux temperature, 100% conversion was achieved. The inorganic salts were filtered and the solvent and the excess of ethylene imine were stripped under reduced pressure. A quantitative yield of crude product having an equivalent weight (determined by electrometric titration with HCl) of 362 (calcd. 295) was thus obtained.

EXAMPLE 15

*Preparation of bisaziridine from bischloromethyl durene*

To a mixture of 93.28 g. (0.4 M) bischloromethyl durene and 241.12 g. (1.6 M) anhydrous $K_2CO_3$ in 400.0 ml. of isopropanol, 68.8 g. (1.6 M) of ethylene imine was added slowly. After 8 hours' reaction time at the reflux temperature, 92% conversion was achieved. The inorganic salts were then filtered off and the solvent and excess ethylene imine were distilled off under reduced pressure. The equivalent weight of the crude product remaining was determined by electrometric titration with HCl and found to be 158 (calcd. 124.1). The aziridine content was 1.70 (calcd. 2.0). The yield was 91% of the theoretical. The product was a waxy, low melting solid, insoluble in water, but soluble in alcohol and in alcohol-water mixtures.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the description set forth herein but rather that the claims be construed as encompassing all the features of patentable novelty which reside in the present invention including all features which would be treated as equivalents thereof by those skilled in the art to which the invention pertains.

We claim:

1. A compound of the formula:

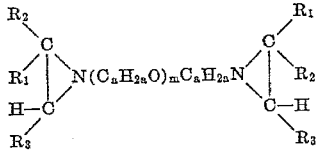

in which $R_1$, $R_2$ and $R_3$ are selected from the group consisting of hydrogen and lower alkyl, $m$ is an integer number and has a value of 2 to 50, and $a$ has a value of 2 to 4.

2.

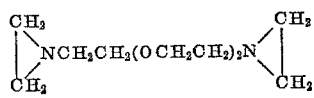

3.

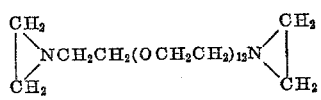

4.

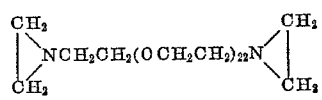

5.

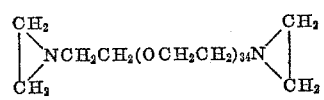

6.

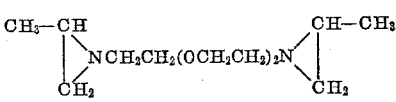

References Cited by the Examiner

UNITED STATES PATENTS

| | | | |
|---|---|---|---|
| 2,265,416 | 12/41 | Bestian | 260—239 |
| 2,327,760 | 8/43 | Bestian | 260—239 |
| 2,831,018 | 4/58 | Trieschmann et al. | 260—239 |

FOREIGN PATENTS

| | | |
|---|---|---|
| 899,955 | 9/44 | France. |

OTHER REFERENCES

Bestian, Liebigs Annalen, vol. 566, pages 210–211, 217, and 233 (1950).

Conant et al., The Chemistry of Organic Compounds (New York, 1947), pages 342–345.

Houben-Weyl, Methoden der Organischen Chemie, vol. 11/2, page 242 (1958).

Lowy et al., An Introduction to Organic Chemistry, (New York, 1945), pages 213–215.

Manecke et al., Ber. Deut. Chem., vol. 95, pages 2700–2707 (1962).

Wagner et al., Synthetic Organic Chemistry (New York, 1953), pages 787 and 827.

Weickmann et al., German Application 1,034,180, July 17, 1958, 1 page.

NICHOLAS S. RIZZO, *Primary Examiner.*

DUVAL T. McCUTCHEN, IRVING MARCUS, WALTER A. MODANCE, *Examiners.*